(No Model.) 5 Sheets—Sheet 1.
A. W. LOCKHART.
FEED REGULATING DEVICE FOR THRASHING MACHINES.
No. 295,185. Patented Mar. 18, 1884.

Witnesses
G. J. Downing.
S. G. Nottingham.

Inventor
A. W. Lockhart.
By H. A. Symons.
Attorney.

(No Model.) 5 Sheets—Sheet 2.
A. W. LOCKHART.
FEED REGULATING DEVICE FOR THRASHING MACHINES.
No. 295,185. Patented Mar. 18, 1884.
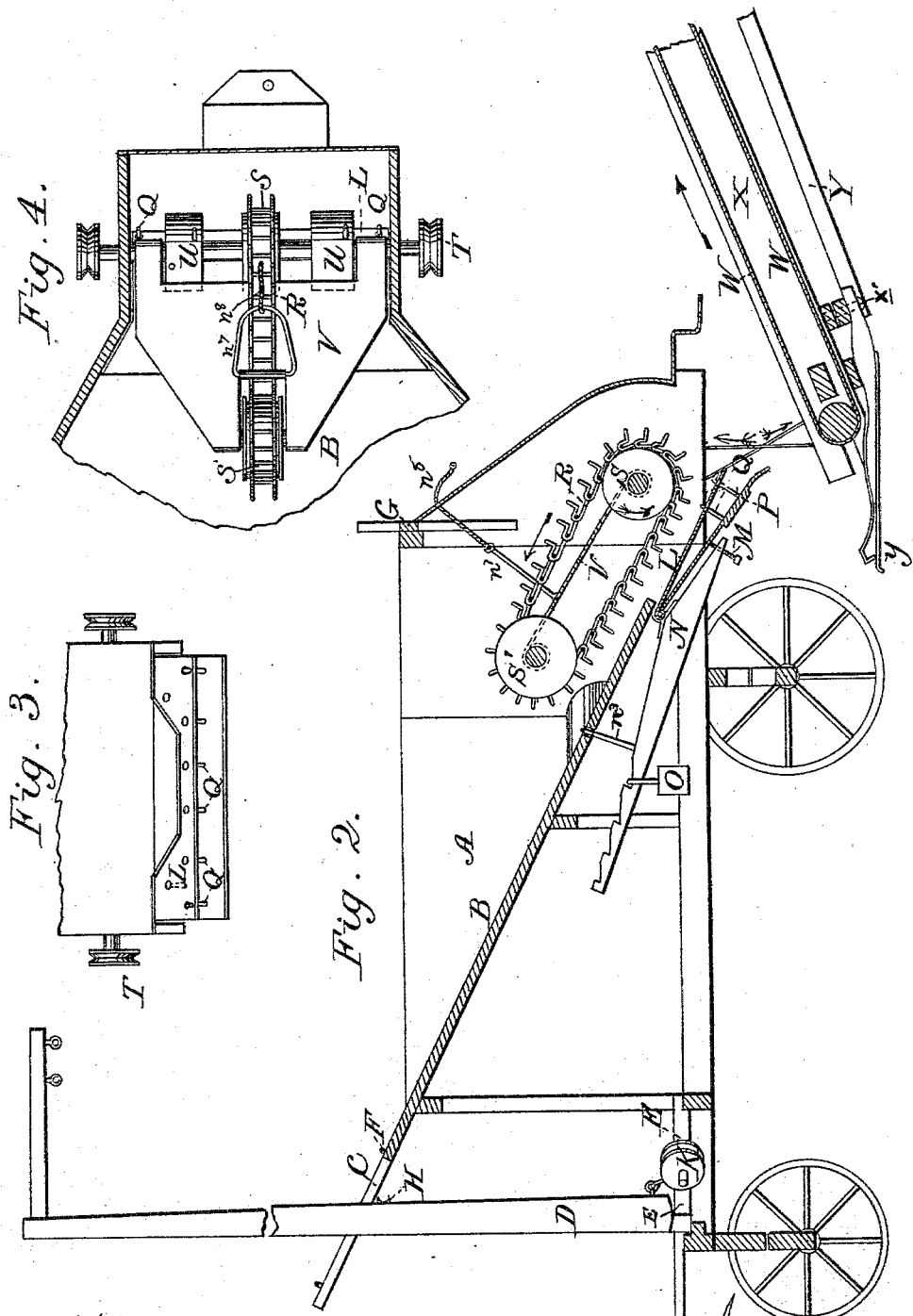

(No Model.) 5 Sheets—Sheet 3.
A. W. LOCKHART.
FEED REGULATING DEVICE FOR THRASHING MACHINES.

No. 295,185. Patented Mar. 18, 1884.

(No Model.) 5 Sheets—Sheet 4.

A. W. LOCKHART.

FEED REGULATING DEVICE FOR THRASHING MACHINES.

No. 295,185. Patented Mar. 18, 1884.

Witnesses
G. F. Downing
S. G. Nottingham

Inventor
A. W. Lockhart
By H. A. Sugmon
Attorney (No Model.) 5 Sheets—Sheet 5.
A. W. LOCKHART.
FEED REGULATING DEVICE FOR THRASHING MACHINES.
No. 295,185. Patented Mar. 18, 1884.
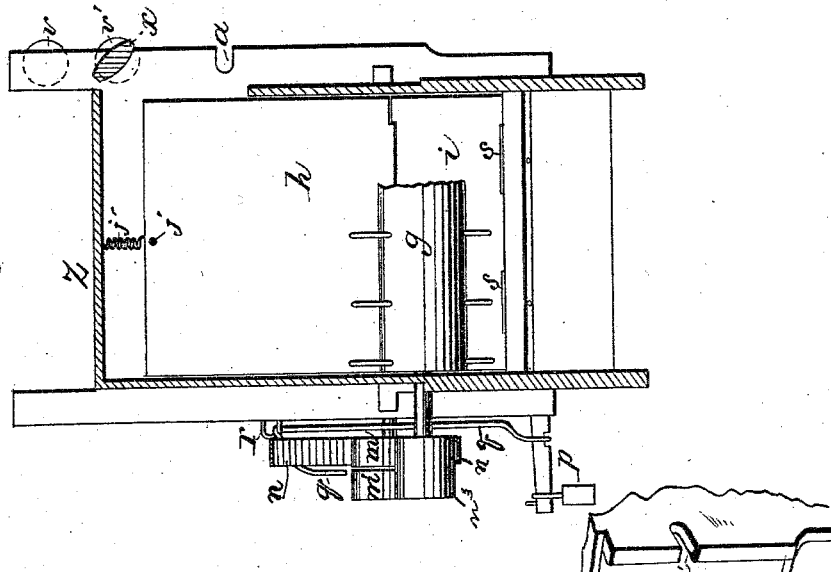
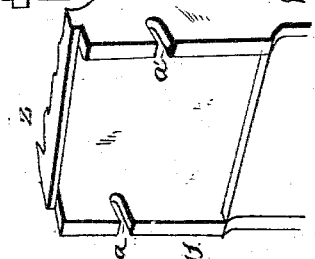
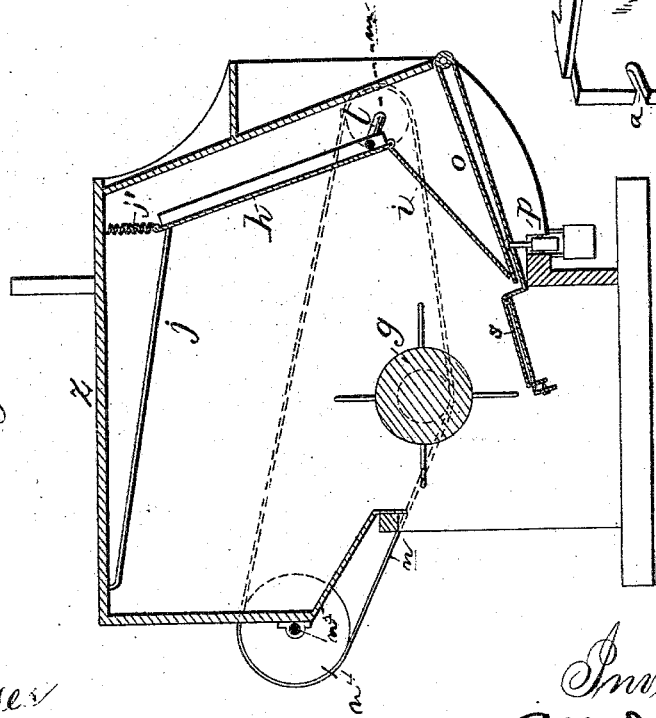

UNITED STATES PATENT OFFICE.

ALEXANDER WASHINGTON LOCKHART, OF SACRAMENTO, CALIFORNIA.

FEED-REGULATING DEVICE FOR THRASHING-MACHINES.

SPECIFICATION forming part of Letters Patent No. 295,185, dated March 18, 1884.

Application filed April 23, 1883. (No model.)

*To all whom it may concern:*

Be it known that I, ALEXANDER W. LOCKHART, of Sacramento, in the county of Sacramento and State of California, have invented certain new and useful Improvements in Feed-Regulating Devices for Thrashing-Machines; and I do hereby declare the following to be a full, clear, and exact description of the invention, such as will enable others skilled in the art to which it appertains to make and use the same.

My invention relates to a novel apparatus for receiving unthrashed straw in bulk from the nets, horse-forks, or other apparatus by which it is handled, delivering it gradually to an inclined carrying-belt, by which it is conveyed to the thrashing-cylinder and deposited upon the same, and to a mechanism for feeding this straw forward to the cylinder continuously. In combination with these devices I employ relief mechanisms by which the movement of the straw is partially checked when too rapid, and by which the feed may be momentarily or entirely checked automatically when the cylinder receives an over-supply.

Figure 1:
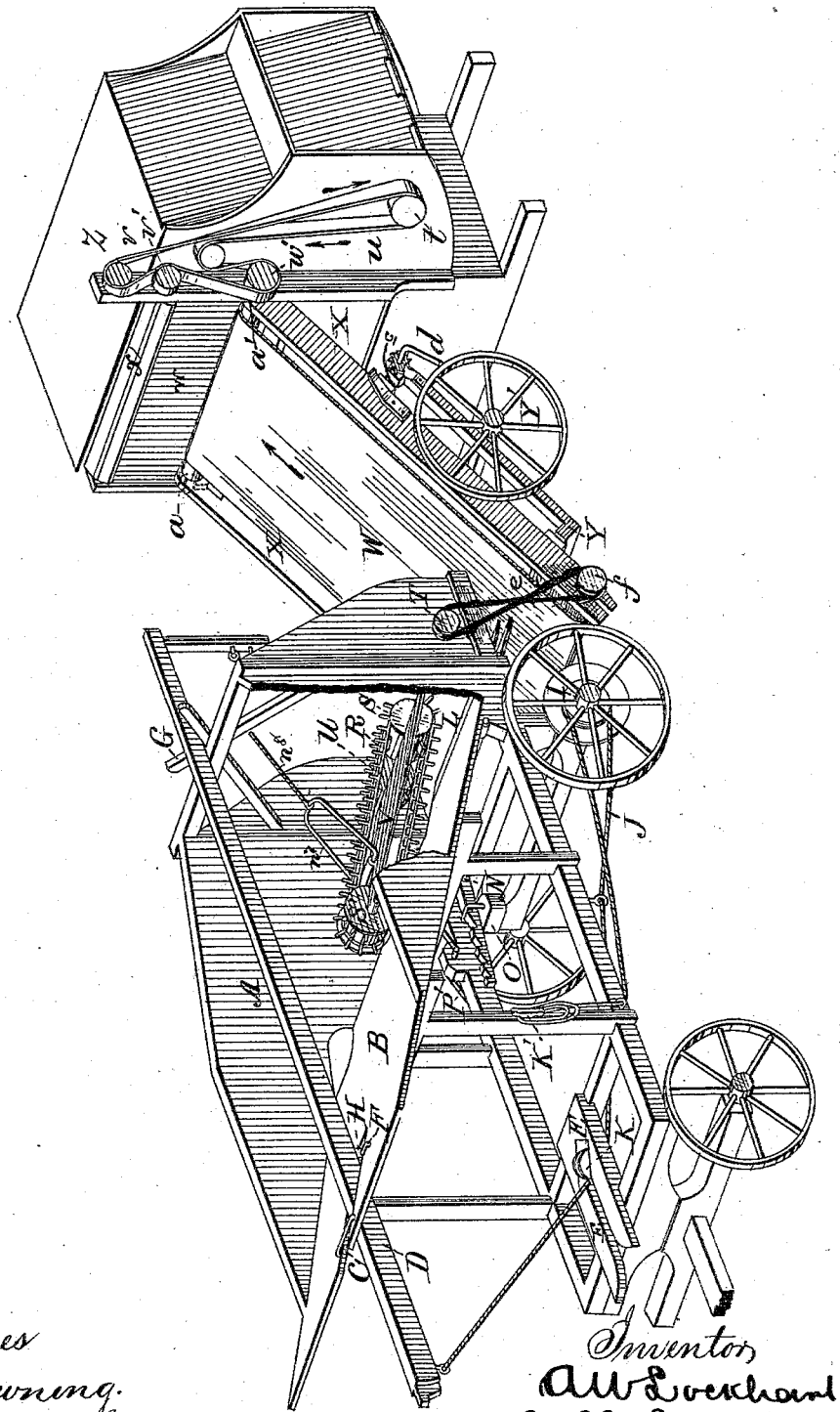
Figure 6:
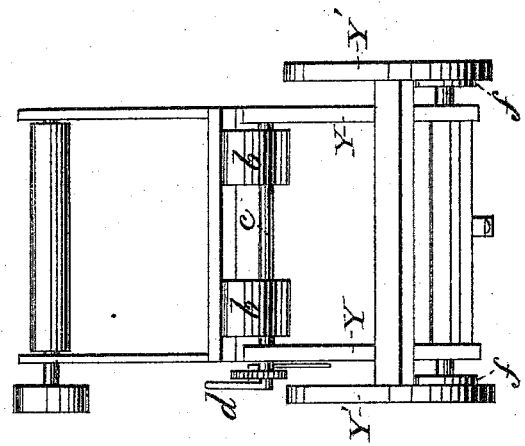
Figure 5:
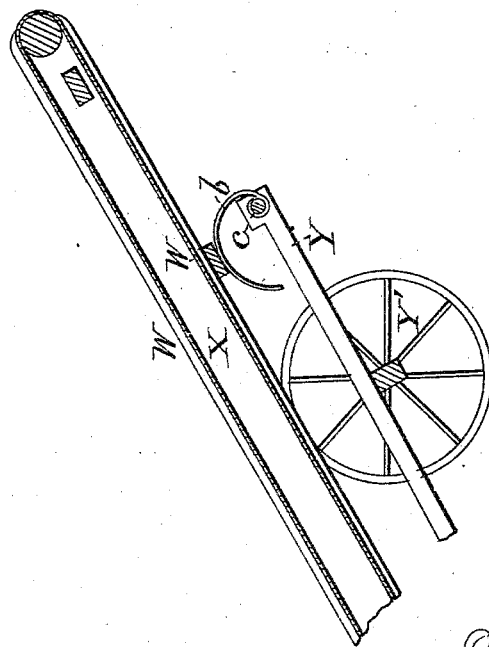
Figure 8:
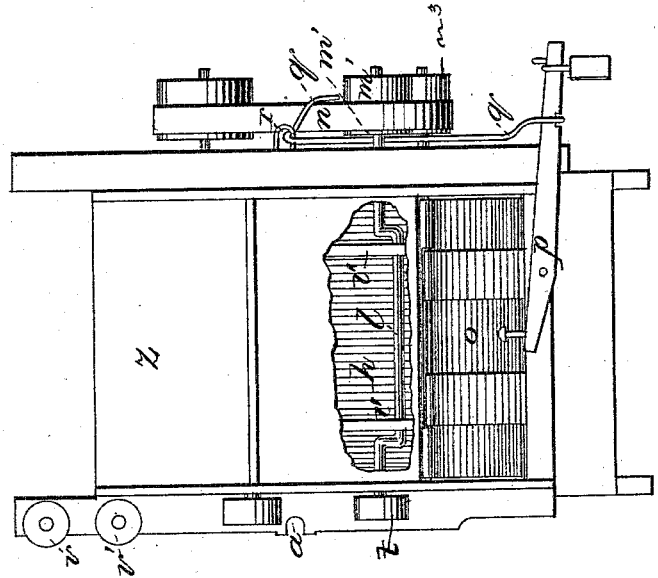
Figure 7:
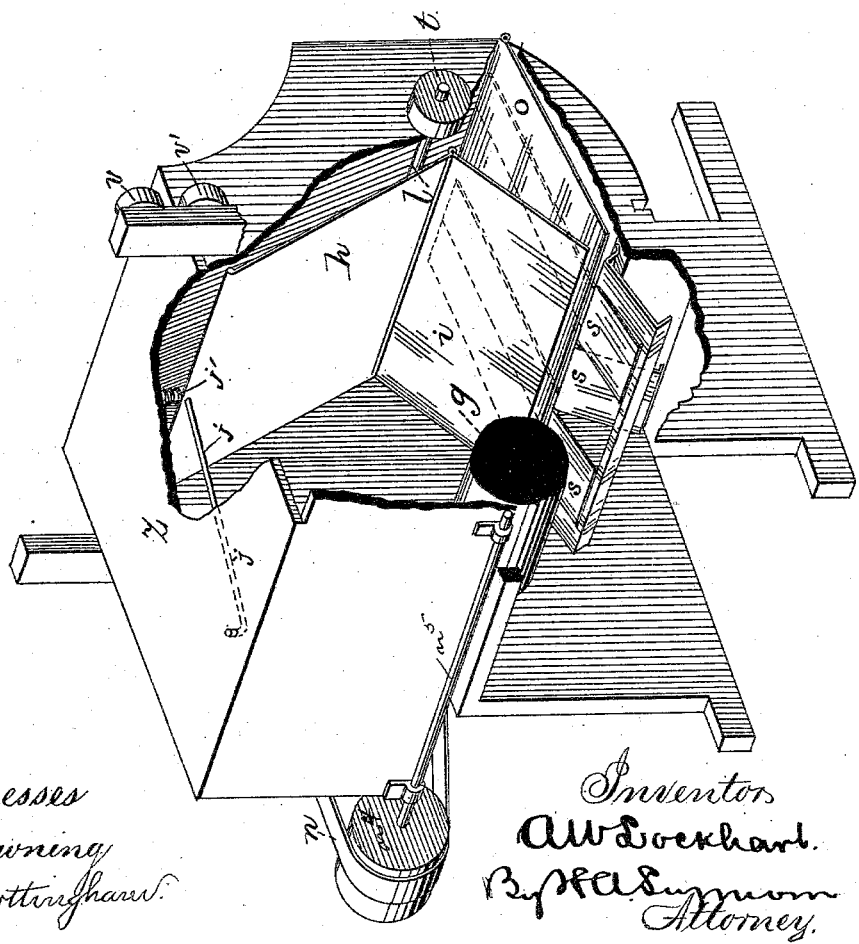

Figure 1 is a perspective view of my entire apparatus. Fig. 2 is a longitudinal section of the hopper A and a portion of the carriage Y. Fig. 3 is a rear elevation of a portion of the hopper A, showing the incline L. Fig. 4 is a plan of a part of the hopper A. Fig. 5 is a longitudinal section of a portion of the carriage Y, carrying the traveling belt W, and showing the cams *b*. Fig. 6 is a rear elevation of the same. Fig. 7 is a perspective view of the thrasher Z, with a portion broken away, showing its interior. Fig. 8 is a rear elevation of the same, a portion of the wall being cut out to show its interior. Fig. 9 is a longitudinal section of the thrasher Z. Fig. 10 is a transverse section of the same; and Fig. 11, a perspective view of a portion of the thrasher-frame, showing the slots *a* and *a'*.

A is a large hopper or receiver, having its bottom B inclined so as to discharge at one end. This hopper is mounted upon wheels with a suitable frame by which it is supported, and the whole is so arranged as to be transported conveniently from place to place. The upper front edge of the hopper is slotted at C, and the derrick-mast D passes down through this slot, its foot being tenoned or formed so that it may be drawn into the slot E in the frame, which serves as a step for it when it is elevated into position for work. When the vehicle is moving and the derrick not in use, it lies down, the lower portion resting upon a stout bar or rod, F, in the lower part of the slot C, while its upper end rests upon the cross-timbers G, which are fixed so as to project above the rear part of the machine. A stout concave or curved metal plate, H, is fixed to the mast where it comes in contact with the rod F, so that when the mast is raised or lowered it turns about this socket, which supports it and prevents its foot from slipping down too far, thus acting as a guide, so that the foot will come into proper position in the step when the mast is raised.

Upon the hub of one of the wheels of the vehicle is fixed a pulley or drum, I, around which a rope, J, passes. One end of this rope leads over a pulley, K, and is attached to the foot of the mast, while the other extends along through guides to a cleat, K', to which it may be belayed after the mast has been raised into position. The operation of raising the mast is performed, just before the vehicle arrives at the point where it is to be set for use, by taking hold of the rope by hand and tightening it around the drum I, which acts as a windlass as the vehicle moves forward, and winding up the rope draws the foot of the mast into its socket or slot E in the frame, the curved plate H clasping the rod F and forming the fulcrum about which the mast turns, and also preventing the foot from slipping down below the level of the slot E. When the mast is up, the rope may be secured, and as the mast has considerable movement in the slot C, it may be adjusted and the usual guy-ropes from the top carried outward and secured to the ground, thus making it firm.

From the lower end of the permanent inclined bottom B a movable incline, L, extends nearly in line with it, its upper edge being hinged just beneath the lower edge of the floor B, so that the incline L practically forms a continuation of B. The lower end of L rests upon an adjusting-screw, M, in the end of a lever, N, which has its fulcrum in line with the hinge of L, and has a weight, O, suspended from its long arm, which extends up beneath the floor B, as shown. The action of this weight upon the lever N tends to keep the lower edge of the incline L up; but if there should be an excess of straw passing down the incline so as to choke the discharge, it would overcome the effect of the weight and depress the incline L. Beneath this incline is a transverse bar or plate, P, with teeth Q projecting upward through the incline L; and there may also be one or more teeth, $n^3$, projecting upward from the long arm of the lever N. When the incline L is forced downward, and the long arm of the lever rises correspondingly, these teeth pass upward through corresponding holes in the incline L and the floor B, and thus temporarily retard and check the movement of the straw. The plate P is supported upon set-screw M, which may be turned or adjusted so as to raise or lower it to cause the teeth to project more or less through the incline when the latter is depressed.

The device for moving the straw downward with regularity consists of a toothed chain belt, R, which passes around pulleys or drums S S'. The shaft of the drum S passes through the sides of the throat near the lower end, and has a pulley, T, upon one end, by which it may be driven. This shaft also has toothed drums or rollers U within the throat and each side of the drum S, to assist in feeding the straw forward. The drum S' is supported by a light frame, V, from the axle of S, and thus has a movement up and down about that axle as a center. This allows it and the toothed belt R to rest upon the top of the mass of straw in the hopper, and the movement of the belt carries the straw downward with regularity. A bail, $n^7$, from the frame V has a cord, $n^8$, extending up, so that the belt may be raised by it, if desired. The straw passing out at the lower end of the hopper A from the incline L and plate P falls upon a traveling belt, W, which passes around drivers or rollers at the opposite ends of a frame, X, of considerable length. This frame has a pin, $x'$, passing through the center of a transverse bar across the lower part near one end, and uniting it to the frame of the carriage Y, upon which it is supported, so that it may swivel from side to side upon this carriage for adjustment. The carriage Y, which is mounted upon the wheels Y', is preferably weighted at one end, so as to cause the said weighted end to drop to the ground when allowed; or, instead of weighting one end of the carriage, the wheels can be placed to one side of the center thereof and accomplish the same end. The carriage Y is then wheeled so that this weighted or lower end will lie beneath the discharge from the hopper A, and the straw will fall from it upon the belt W. The thrashing-machine Z is then driven up so that the upper end of the belt frame X may be connected with it to discharge its contents into the thrashing-cylinder case. This may be done either at one end of the machine or, as shown in the present case, at one side. When the thrasher has been set in position, the frame X may be moved from side to side about its pivot-pin, so as to adjust its upper end to fit the upper roller-shaft to slots $a$ $a'$ in the side of the thrasher-frame, its lower end having already been placed with relation to the hopper A.

In order to easily and properly present the upper roller of the belt W to the slots $a$ and $a'$ in the thrasher, I employ cams $b$, which are fixed to the shaft $c$, across the upper end of the carriage-frame, the function of the said slots being to form supports for the said roller, and in which it rotates. This shaft $c$ may be revolved by a crank, $d$, and the cams moving beneath the frame X will raise it to the proper height, where it may be held until the carriage Y has been pushed forward just enough to carry the roller-shaft into the slots $a$ $a'$, when the pawl may be released, so as to allow the upper end of the frame X to be supported in the slots upon the thrasher-frame, the thrasher being backed sufficiently to make the incline L and plate P overhang the belt W. The toothed feed-belt R within the hopper A is driven by a belt, $e$, extending from the pulley T on drum S to the pulley $f$ upon the end of the lower roller-shaft of the belt W. To shift this belt, it is necessary to lift the lower end of the frame X, and this is also done by means of the cams $b$ after the upper end has been connected with the thrashing-machine. This connection having been made, as above described, it will be manifest that when the cams are again made to lift the frame X the upper roller-shaft serves as a fulcrum about which the lower end of the frame may be lifted until the belt $e$ has been adjusted. When allowed to settle down, the weight of the frame will provide a sufficient tension upon the belt $e$ to drive the toothed feeder-belt in the hopper A. When the unthrashed straw reaches the upper end of the belt W, it is delivered through an opening, $w$, in the side of the cylinder-case upon the top of the cylinder $g$, so as to be carried by the latter in the usual manner between the concave and the cylinder.

As the masses of straw are liable to form an arch above the cylinder, and not feed regularly or fast enough, I provide a device by which the straw is forced against and beneath the cylinder, consisting of the plates $h$ and $i$, hinged together at their meeting edges, the upper plate being suspended by its upper edge from a vibrating arm, $j$, and by the spring J' to steady it in its vertical movements. A cranked shaft, $l$, extends across behind the lower part of the upper plate, $h$, passing through boxes $l'$ upon the back of the plate, and this shaft has a pulley, $m$, upon one end, by which a belt, $n$, from some suitable part of the machine drives it. This belt $n$ also passes under the pulley $n^3$ of the cylinder $g$, and around pulley $n^4$ of the shaft $n^5$. In the lower part of the case is an inclined bottom, o, upon which the lower edge of the plate i rests, and the vibratory movement of the lower part of h is communicated to the upper edge of the plate i, while its lower edge slides upon the inclined bottom or floor o. The angle at which these plates stand to each other and to a perpendicular, together with the peculiar movement communicated to them, causes them to press the straw downward and forward against the cylinder, so that the latter may always have a regular and sufficient supply.

In order to guard against an excess of straw being fed to the machine, I have made it automatically regulating as follows: The inclined bottom o is hinged at its upper end, and its lower end rests upon the short arm of a lever, p, the long arm of which carries a weight so as to act upon the bottom o in a manner similar to the action of the lever N upon the incline L of the hopper A. The driving-pulley m has a loose pulley, m', by its side upon the same shaft, and a belt-shifting arm, q, has one end attached to the lever p, while its upper end slides upon a guide, r, projecting from the side of the machine, so that when the long arm of the lever p rises this belt-shifter throws the belt from the pulley m to the loose pulley m', and as the carrying-belt W is driven from a pulley, t, upon the opposite end of the shaft l and the devices in the feed-hopper from W, it will be seen that the whole will be stopped at once by such a pressure of straw upon the bottom o as would depress it and cause it to act upon the lever p and belt-shifter q. As soon as this pressure is relieved, the belt is returned upon the pulley m by the reverse movement of the parts, and the feeding again goes on.

In front of the bottom o and between it and the thrashing-concave are a series of hinged doors, s, which are arranged to give way and allow any hard substance—as a stone, nut, or loose cylinder-tooth—to escape without breaking the machine.

The power for driving the whole of this feeding mechanism is transmitted by the belt n, which drives the crank-shaft l and the pulley t upon the end opposite to the pulley m. From this pulley t a belt, u, passes around the pulleys v v', and thence to the pulley w' upon the upper roller-shaft of the belt W.

The beater x is fixed to the shaft of the pulley v', so as to be driven by the belt u, and the power is transmitted by the feeder-belt W to the devices in the hopper A, as before described, the function of the said beater being to insure and aid in the delivery of the straw through the opening w.

When the apparatus is to be moved from place to place, the frame X upon the carriage Y is connected with the rear of the mounted hopper A by a tongue, y, so that one team hauls these parts, and another the thrasher. By simply uncoupling this tongue y and dropping the end of the frame x upon the ground when a station is reached, the parts are almost in position for use.

Having thus described my invention, what I claim as new, and desire to secure by Letters Patent, is—

1. In a feeder for thrashing-machines, the receiving-hopper A, provided with the inclined slotted bottom B, the slotted step, and the supporting-frame, in combination with the derrick-mast D, having a semicircular fulcrum-plate, H, and the rod F, upon which it turns, substantially as described.

2. The receiving-hopper A, the frame provided with supporting-wheels, and a derrick-mast fulcrumed upon the front edge of the hopper, in combination with the winding-drum I upon one of the wheel-axles, and the rope J, attached to the foot of the mast and passing around the drum, substantially as shown and described.

3. The hopper A, having the inclined bottom B, the hinged adjustable extension L, and weighted lever-arm N, in combination with the bar or plate P, provided with the upwardly-projecting teeth Q, substantially as described.

4. The receiving-hopper A, having an inclined bottom, B, and the hinged adjustable extension L, in combination with the toothed feeding-belt R, the fixed rotary pulley S, the vertically-movable pulley S', and the movable frame V, substantially as described.

5. In combination with the hopper A, having an inclined bottom, B, hinged adjustable extension L, and toothed plate P beneath, the toothed chain belt R, adapted at its upper end to rise or fall with the supply of the straw beneath it, and the toothed rollers U, substantially as described.

6. The hopper A, having an inclined bottom, B, the hinged adjustable extension L, and feeding devices, in combination with the inclined carrying-belt W, its rollers, the frame X, the pulley f, the belt e, and the pulley T, substantially as shown and described.

7. The carrying-belt W, the pivoted frame X, and the wheel-carriage Y, provided with a shaft, c, having cams b, a crank, d, and the holding pawl and ratchet, in combination with the thrashing-cylinder casing having slots to receive the ends of the upper roller of the belt W, substantially as shown and described.

8. In combination with the hopper A, the feed mechanism, and the inclined carrying-belt W, the thrashing-machine having the upper part of the cylinder-case open to receive the straw from the belt W, and the movable hinged plates h and i, as and for the purpose herein described.

9. The hinged plates h and i, and the vibrating suspending-arm j, and the spring j', in combination with the cranked shaft l, connected with the plate h near the hinge, substantially as herein described.

10. The hinged plates h and i, and means for imparting thereto a vibratory movement, in combination with the inclined hinged bottom $o$ and the weighted lever-arm $p$, substantially as herein described.

11. The hinged and movable plates $h$ and $i$, the inclined hinged floor $o$, and the weighted lever-arm $p$, in combination with the belt-shifting arm $q$ and the driving-belt $n$, substantially as herein described.

12. In combination with the thrashing-machine Z, hopper A, feeding-belts R and W, pulleys T $f$, and belt $e$, of the pulleys $t$, $w$, $v$, and $v'$, arranged with relation to each other as shown and described, the single belt $u$, passing around said last-named pulleys, substantially as herein described.

In witness whereof I hereunto set my hand.

ALEXANDER WASHINGTON LOCKHART.

Witnesses:
R. I. CAREY,
G. W. CAREY.